Figure 1:
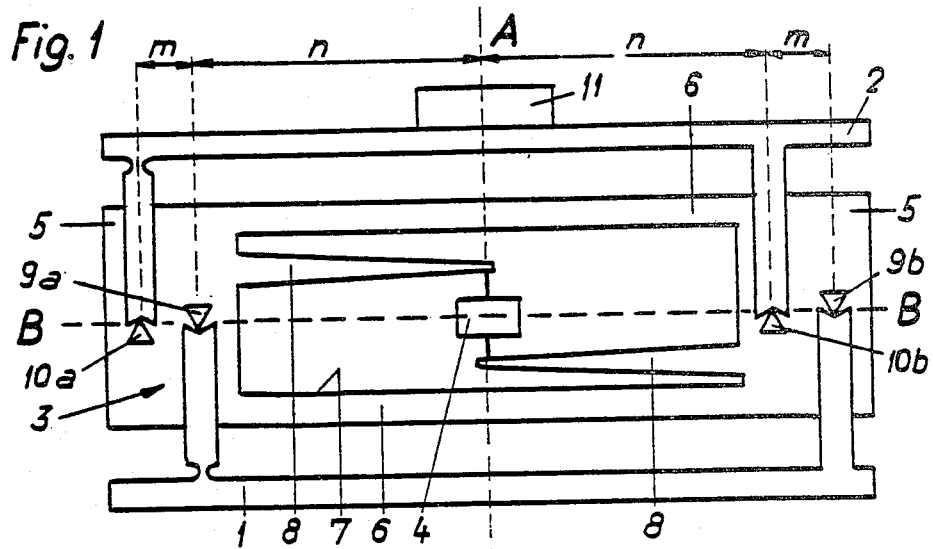

United States Patent [19]

Wirth et al.

[11] 4,343,196
[45] Aug. 10, 1982

[54] MASS AND FORCE METER

[75] Inventors: Johannes Wirth; Mario Gallo, both of Zurich, Switzerland

[73] Assignee: Wirth, Gallo & Co., Zurich, Switzerland

[21] Appl. No.: 185,418

[22] Filed: Sep. 9, 1980

[30] Foreign Application Priority Data

Aug. 25, 1980 [EP] European Pat. Off. ......... 80105032.9

[51] Int. Cl.³ ............................................... G01L 1/04
[52] U.S. Cl. ................................. 73/862.62; 177/211; 177/225
[58] Field of Search ........... 73/862.59, 862.62, 862.64; 177/211, 225, 229, 230

[56] References Cited

U.S. PATENT DOCUMENTS

| | | | |
|---|---|---|---|
| 3,366,189 | 1/1968 | Bellier | 177/211 X |
| 3,599,739 | 8/1971 | Hyer | 177/211 |
| 4,020,686 | 5/1977 | Brendel | 73/862.62 |

*Primary Examiner*—Charles A. Ruehl

*Attorney, Agent, or Firm*—Stevens, Davis, Miller & Mosher

[57] ABSTRACT

Mass and force meter with a body, a load support, a load cell, an intermediate body mounted between said body and said load support and supported by said body over a number of supporting points, said load support being supported by said intermediate body over the same number of loading points, whereby said supporting and loading points are mounted pairwise in the same horizontal plane, said intermediate body consisting of two rigid parts linked by two horizontal, flexible parts mounted one below the other, said supporting and loading points being anchored to said rigid parts, said loading points being shifted horizontally by the same amount and in the same direction from said supporting points, whereby at least one spring, the resilience of which is much greater than that of said flexible parts, has one of its ends fitted into one of said rigid parts, its other end being linked with said load cell which is linked to the other rigid part.

4 Claims, 5 Drawing Figures

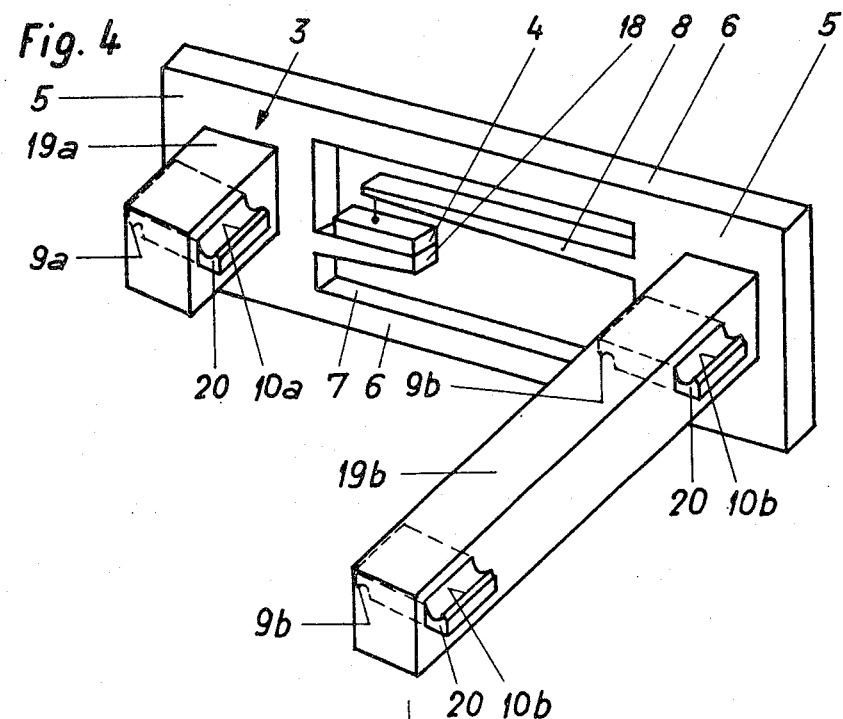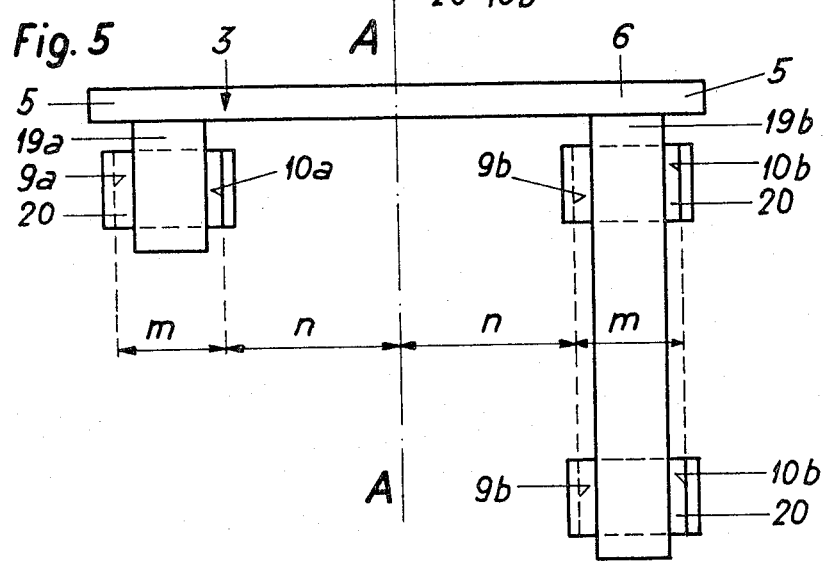

MASS AND FORCE METER

The present invention relates to a mass and force meter with a body, a load support, a load cell, an intermediate body mounted between said body and said load support, in which said load support is supported by said intermediate body over a number of loading points and said intermediate body is supported by said body over the same number of supporting points, said loading and supporting points being mounted pairwise in the same horizontal plane.

Such meters are known for instance from European patent application No. 79200252.8. They exhibit a bendable intermediate body mounted between the body of the meter and the load support. This intermediate body is loaded by the loading and supporting forces and bends under the action of the moments generated by these forces. The forces generated by this bending of the intermediate body are in turn transmitted to a rigid load cell by means of suitable springs. The output signals of the load cell are processed in well known manner. The result of the measurement can then be further processed and/or displayed. Such meters are suitable in many applications where they replace advantageously usual weighing bridges mounted on a lever system.

A rigid load cell is a device in which the force to be measured acts on the force input of the load cell in such a way that practically only virtual movements of the elements of the load cell occur.

In the known meters the amount of bending of the intermediate body, which is used as a measure of the magnitude of the mass or force to be measured, is transmitted over two vertical springs the length of which determines the total height of the meter. Where the application requires a low total height of the meter, the length of these springs cannot be shortened at will, as their virtual bending would decrease too much. In order to be still able to measure it reliably the requirements for the invariability of the geometry of the meter would be so high that they could not be satisfied technically and economically.

It is an object of the invention to provide a meter of type mentioned in which loading of the intermediate body and transmission of its bending to a load cell occur without requiring extreme conditions for its geometry and still allowing for a low total height of the meter.

It is another object of the invention to provide a meter such that the intermediate body comprises two rigid parts linked to each other by two horizontal, flexible parts mounted one below the other, the loading and supporting points are anchored to said rigid parts, said loading points being shifted horizontally from the supporting points by a same amount and in the same direction, at least one spring, the resilience of which is much greater than that of said flexible parts, is fitted at one of its ends into one of said rigid parts, its other end being linked with said load cell, itself linked to the other rigid part.

Such meters have the advantage of allowing a reduction of the force to be measured without requiring additional specific means to this effect. According to the design of the intermediate body the measuring force which acts on the load cell and which is proportional to the force to be measured can be in the desired ratio to said force to be measured.

Embodiments of the invention are represented schematically in the enclosed drawing.

Figure 2:
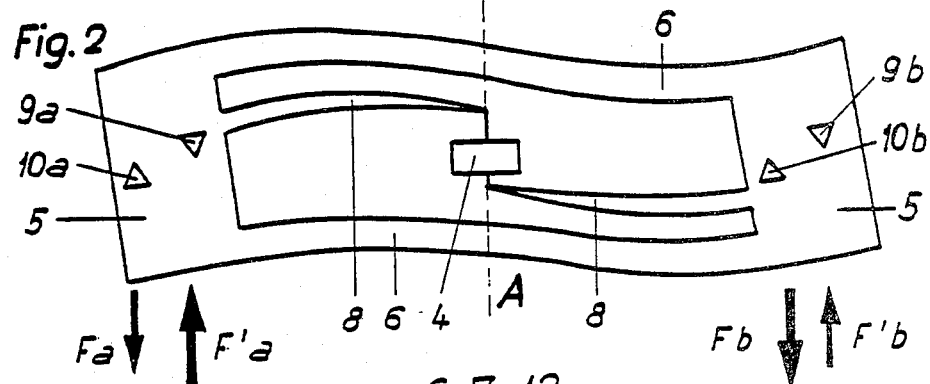
Figure 3:
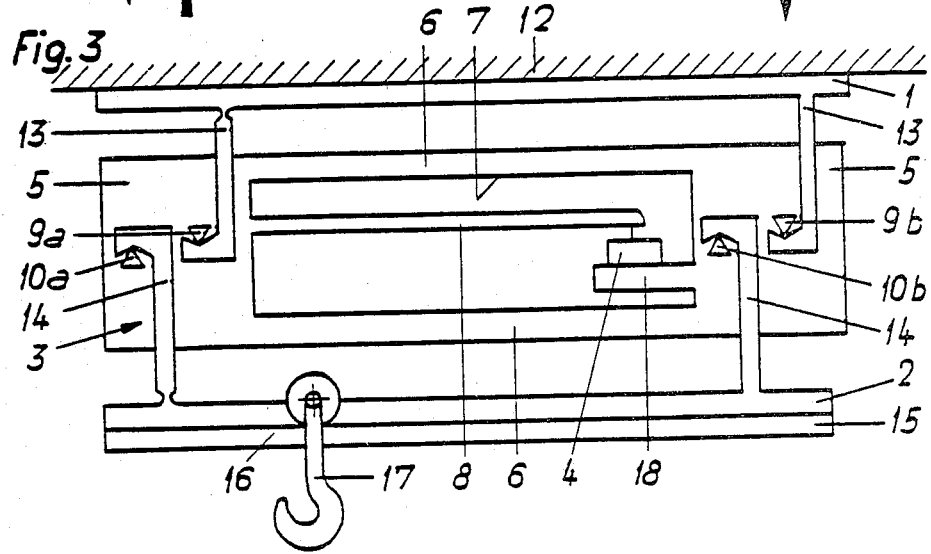

FIG. 1 shows a first embodiment.
FIG. 2 shows the intermediate body of FIG. 1 when loaded.
FIG. 3 shows a second embodiment.
FIG. 4 shows a variant of the intermediate body.
FIG. 5 shows a view from above of the intermediate body of FIG. 4.

The meter schematically represented in FIG. 1 has a body 1, a load support 2, an intermediate body 3 and a rigid load cell 4. For the sake of simplicity the computing and display device in which the output signals of load cell 4 are processed is not represented.

Intermediate body 3 comprises two rigid parts 5 linked to each other by two parallel, horizontal, equal, flexible parts 6 mounted one below the other. In its middle intermediate body 3 exhibits a square opening 7 in which two springs 8 are mounted, the resilience of which is much greater than that of flexible parts 6. Springs 8 are of one part with rigid parts 5. Their free ends are linked to load cell 4. Intermediate body 3 can preferably be manufactured by punching a metal plate. The symmetry plane of intermediate body 3, called neutral plane, is that of the drawing. The symmetry plane perpendicular to the neutral plane is indicated by line AA.

Intermediate body 3 has two supporting knives 9a, 9b and two loading knives 10a, 10b which all four lie in the horizontal median plane BB of intermediate body 3. Loading knives 10a, 10b are shifted to the left of supporting knives 9a, 9b by the same amount m. The distance n of supporting knife 9a from symmetry plane AA is equal to the distance of loading knife 10b from this symmetry plane. Supporting and loading knives are mounted on both sides of intermediate body 3 symmetrically with regard to the neutral plane. They are pressed into intermediate body 3 and extend on both sides.

As springs 8 are considerably more flexible than flexible parts 6 the amount by which they influence the behaviour of intermediate body 3 when loaded can be neglected.

When a mass 11 is put centrally on load support 2, intermediate body 3 is loaded asymmetrically. Supporting knives 9a, 9b and loading knives 10a, 10b are differently loaded as their distances (m+n) and n from symmetry plane AA are unequal. As a consequence of their relative positions force Fb acting on loading knife 10b is equal to, and in opposite direction of, reaction force F'a of body 1 acting on supporting knife 9a. The same applies for force F'b acting on supporting knife 9b and reaction force Fa acting on loading knife 10a.

Under the action of these four external forces intermediate body 3 remains in equilibrium because the algebraic sum of these forces and of the moments they generate is zero. Consider now intermediate body 3 cut in two parts along symmetry plane AA. Each part would stand under the action of a pair of external forces Fb, F'a and Fa F'b respectively and would not be in equilibrium. In order to achieve it a vertical force directed downwards is needed for the left hand half and a same force directed upwards is needed for the right hand half. Because flexible parts 6 are identical these two forces are equally distributed in these two parts 6. When mass 11 is loaded centrally both flexible parts 6 are equally loaded and their load in each of their cross-sections consists of a constant vertical force and of a moment which varies linearly in function of the distance of the cross-section considered from an axis perpendicular to the neutral plane. Intermediate body 3 bends into an S-form, its load consists of a linear and a quadratic part. No horizontal forces act along flexible parts 6.

Under the effect of the load rigid parts 5 move vertically with respect to each other. As the position of the free ends of springs 8 is fixed, these springs 8 bend accordingly. The relative displacement of these ends with regard to their other ends fixed to rigid parts 5 is equal to half the relative displacement of rigid parts 5. The force exerted by these springs 8 on load cell 4 is a measure of the magnitude of mass 11.

When this mass 11 is put asymmetrically on load support 2, the load exerted on intermediate body 3 is the same as in the case of a central load with the addition of two additional, identical, forces having opposite directions and acting on loading knives 10a and 10b respectively. These forces generate a moment so that, in order to ensure equilibrium of intermediate body 3, supporting knives 9a, 9b must generate a same moment in the opposite sense. As the distance m between the supporting and loading knives 9a, 10a and 9b, 10b is the same the additional supporting forces are equal to the additional loading forces. The moment generated by these additional forces compensate each other pairwise in form of a constant pulling force in one of the flexible parts 6 and of an equally dimensioned pressure force in the other. The corresponding relative rotation of rigid parts 5 generates only a corresponding relative rotation of the ends of springs 8 fitted in these rigid parts 5. Load cell 4 being centrally mounted is not influenced by these pulling and pressure forces acting in flexible parts 6.

In FIG. 3 a second embodiment is schematically represented in which body 1 is fixed to a ceiling 12. Intermediate body 3 is suspended to body 1 by means of suspension gears 13 and load support 2 is suspended to intermediate body 3 by means of suspension gears 14. A rail 15 is fixed to load support 2. The load (not represented) can be suspended to a hook 17 fixed to a roll 16 on rail 15. Load cell 4 is fitted to a bracket 18 of the right hand rigid part 5. It is linked to one spring 8 only.

When the load acts centrally, the meter behaves as described for FIGS. 1, 2. When the load does not act centrally, that end of spring 8 fitted to the left hand rigid part 5 rotates relatively to bracket 18. The corresponding error is proportional to the coordinate of the load along rail 15. In order to compensate this error the distance m of knives 9a, 10a, and 9b, 10b must be adjusted. As the linear deformation of flexible parts 6 is considerably smaller than their deformation due to flexion, this adjustment is of the order of magnitude of few o/oo. With other words, the distance m between all pairs of knives can still be considered as being the same.

In FIGS. 4 and 5 a variant of intermediate body 3 is represented, in which the pairs of knives are not mounted symmetrically with respect to the neutral plane. Rigid tubes 19a, 19b of quadratic section are fixed to rigid parts 5 perpendicularly to the neutral plane. Tube 19a bears a knives support 20 with one supporting knife 9a and one loading knife 10a. Tube 19b bears two such knives supports 20, each with one supporting knife 9b and one loading knife 10b.

This one-sided loading of intermediate body 3 generates a parasitic torsion moment around a central, horizontal axis in the neutral plane. This moment generates no error as long as load cell 4 and spring 8 are mounted in the same vertical plane as flexible parts 6. In this case too, the distance between supporting knife 9a and loading knife 10a must be adjusted.

A similar embodiment could exhibit two identical tubes 19a, 19b with two pairs of knives each. These tubes can consist of molded or forged elements, they need not be hollow.

In all embodiments springs 8 and corresponding rigid parts 5 form one part, as this is technically speaking a good solution. Springs 8 could as well be fitted to rigid parts 5 by other fastening methods. They could, as well as load cell 4, be mounted above or below opening 7.

Also flexible parts 6 and rigid part 5 must not necessarily be manufactured from the same plate. It is only necessary that the ends of flexible parts 6 be fitted into rigid parts 5. Flexible parts 6 need not necessarily be identical.

The knives could be replaced by flexible articulations or by pressure and pulling bands. In all embodiments the knives are in the same horizontal middle plane BB. They need only to be pairwise in the same horizontal plane, that is a supporting knife with its associated loading knife.

Load cells to be used are not described in detail as they are well known in the art and commercially available. They all have at least one force input. As load cells are suitable: dynamometer of standard design, strain gauge, mass or force meters with one or more vibrating strings. In its simplest form the load cell can be constituted by one single vibrating string, the frequency variations of which under load can be processed in the computing device not represented as measure for the magnitude of the load.

We claim:

1. In a mass and force meter a body, a load support, a load cell, an intermediate body mounted between said body and said load support and comprising two rigid parts linked to each other by two horizontal, flexible parts mounted one below the other, a number of loading points anchored to said rigid parts, a same number of supporting points anchored to said rigid parts, said loading points and said supporting points being mounted pair-wise in the same horizontal plane, said loading points being shifted horizontally by the same amount and in the same direction from said supporting points, said intermediate body being supported by said body over said supporting points, said load support being supported by said intermediate body over said loading points, at least one spring with two ends the resilience of which is much greater than that of said flexible parts, said spring having one of its ends fitted into one of said rigid parts and its other end being linked to said load cell, the latter being linked to the other of said rigid parts.

2. In a mass and force meter a body, a load support, a load cell, an intermediate body mounted between said body and said load support and comprising two rigid parts linked to each other by two horizontal, flexible parts mounted one below the other, a number of loading points anchored to said rigid parts, a same number of supporting points anchored to said rigid parts, said loading points and said supporting points being mounted pairwise in the same horizontal plane, said loading points being shifted horizontally by the same amount and in the same direction from said supporting points, said intermediate body being supported by said body over said supporting points, said load support being supported by said intermediate body over said loading points, at least one spring with two ends the resilience of which is much greater than that of said flexible parts, said spring having one of its ends fitted into one of said rigid parts and its other end being linked to said load cell, the other of said rigid parts having a bracket, said load cell being fitted into said bracket.

3. In a mass and force meter a body, a load support, a load cell, an intermediate body mounted between said body and said load support and comprising two rigid parts linked to each other by two horizontal, flexible parts mounted one below the other, a number of loading points anchored to said rigid parts, a same number of supporting points anchored to said rigid parts, said loading points and said supporting points being mounted pairwise in the same horizontal plane, said loading points being shifted horizontally by the same amount and in the same direction from said supporting points, said intermediate body being supported by said body over said supporting points, said load support being supported by said intermediate body over said loading points, two springs with two ends each, the resilience of which is much greater than that of said flexible parts, the first of said springs having one of its ends fitted into one of said rigid parts and its other end being linked to said load cell, the second of said springs having one of its ends fitted into the other of said rigid parts and its other end being linked to said load cell.

4. In a mass and force meter a body, a load support, a load cell, an intermediate body mounted between said body and said load support and comprising two rigid parts linked to each other by two horizontal, flexible parts mounted one below the other, a rigid tube being fixed to each of said rigid parts perpendicularly to the plane of said rigid parts, a number of loading points anchored to said tubes, a same number of supporting points anchored to said tubes, said loading points and supporting points being mounted pairwise in the same horizontal plane, said loading points being shifted horizontally by the same amount and in the same direction from said supporting points, said intermediate body being supported by said body over said supporting points, said load support being supported by said intermediate body over said loading points, at least one spring with two ends the resilience of which is much greater than that of said flexible parts, said spring having one of its ends fitted into one of said rigid parts and its other end being linked to said load cell, the latter being linked to the other of said rigid parts.

* * * * *